(12) United States Patent
Chee

(10) Patent No.: US 10,457,404 B2
(45) Date of Patent: Oct. 29, 2019

(54) CARBON NANOTUBE ANTI-ICING AND DE-ICING MEANS FOR AIRCRAFT

(71) Applicant: Wan Tony Chee, Redmond, WA (US)

(72) Inventor: Wan Tony Chee, Redmond, WA (US)

(*) Notice: Subject to any disclaimer, the term of this patent is extended or adjusted under 35 U.S.C. 154(b) by 0 days.

(21) Appl. No.: 15/844,492

(22) Filed: Dec. 15, 2017

(65) Prior Publication Data

US 2018/0215476 A1    Aug. 2, 2018

Related U.S. Application Data

(60) Provisional application No. 62/452,927, filed on Jan. 31, 2017.

(51) Int. Cl.
| | | |
|---|---|---|
| *B64D 15/12* | (2006.01) | |
| *B64D 15/22* | (2006.01) | |
| *C09D 5/24* | (2006.01) | |
| *C01B 32/158* | (2017.01) | |
| *C01B 32/182* | (2017.01) | |
| *C09D 175/04* | (2006.01) | |

(52) U.S. Cl.
CPC ............ *B64D 15/12* (2013.01); *B64D 15/22* (2013.01); *C01B 32/158* (2017.08); *C01B 32/182* (2017.08); *C09D 5/24* (2013.01); *C09D 175/04* (2013.01); *C01B 2202/22* (2013.01); *C01B 2204/22* (2013.01); *C08K 2201/001* (2013.01)

(58) Field of Classification Search
CPC ................................ B64D 15/12; B64D 15/14
See application file for complete search history.

(56) References Cited

U.S. PATENT DOCUMENTS

| | | | | |
|---|---|---|---|---|
| 8,337,658 | B2* | 12/2012 | Hasegawa | ........... B29C 66/7392 |
| | | | | 156/272.2 |
| 8,581,158 | B2* | 11/2013 | Heintz | ................... C08F 259/08 |
| | | | | 219/482 |
| 8,752,279 | B2* | 6/2014 | Brittingham | ............... C08J 3/18 |
| | | | | 29/611 |
| 8,931,740 | B2* | 1/2015 | Nordin | ...................... B64C 3/20 |
| | | | | 244/134 D |
| 9,091,657 | B2* | 7/2015 | Kessler | .................. G01N 25/72 |
| 9,193,466 | B2* | 11/2015 | Calder | ................... B64D 15/12 |
| 9,415,875 | B2* | 8/2016 | Stiesdal | ................. B64D 15/12 |
| 9,511,871 | B2* | 12/2016 | Steinwandel | ......... B64D 15/12 |
| 9,932,115 | B2* | 4/2018 | Le Garrec | ............. B64D 15/12 |
| 10,155,593 | B2* | 12/2018 | Burton | ................... B64D 15/12 |
| 2002/0153368 | A1* | 10/2002 | Gardner | ................. B29C 70/82 |
| | | | | 219/545 |

(Continued)

*Primary Examiner* — Joseph W Sanderson
(74) *Attorney, Agent, or Firm* — Wooshik Shim; John D. Houvener; Bold IP, PLLC

(57) ABSTRACT

A system and method for anti-icing and de-icing an aircraft are provided. The system includes an electrically conductive coating, an electrical circuit having one or more electrical leads, a control unit, a plurality of temperature sensors connected to the control unit, and a plurality of ice detector sensors connected to the plurality of temperature sensors and the control unit. A process for anti-icing and de-icing an aircraft is also provided that includes applying electrically conductive coating under the skin of an airplane surface and attaching electrical wiring or metal strips to the skin of the airplane surface, and directing electricity to the electrical wiring or metal strips.

12 Claims, 12 Drawing Sheets

(56) References Cited

U.S. PATENT DOCUMENTS

| | | | |
|---|---|---|---|
| 2010/0126981 A1* | 5/2010 | Heintz | C08F 259/08 |
| | | | 219/482 |
| 2011/0240621 A1* | 10/2011 | Kessler | G01N 25/72 |
| | | | 219/200 |
| 2012/0082806 A1* | 4/2012 | Kissell | C09D 5/24 |
| | | | 428/34.1 |
| 2013/0022465 A1* | 1/2013 | Stiesdal | B64D 15/12 |
| | | | 416/95 |
| 2013/0028738 A1* | 1/2013 | Nordin | H05B 3/145 |
| | | | 416/39 |
| 2013/0043342 A1* | 2/2013 | Nordin | B64C 3/20 |
| | | | 244/1 A |
| 2014/0070054 A1* | 3/2014 | Burton | B64D 15/12 |
| | | | 244/134 D |
| 2014/0127017 A1* | 5/2014 | Virtanen | C09D 5/24 |
| | | | 416/95 |
| 2014/0151353 A1* | 6/2014 | Steinwandel | B64D 15/12 |
| | | | 219/202 |
| 2015/0053663 A1* | 2/2015 | Sakota | B64C 1/12 |
| | | | 219/202 |
| 2016/0009400 A1* | 1/2016 | English | B64D 15/20 |
| | | | 244/134 R |
| 2016/0221680 A1* | 8/2016 | Burton | B64D 15/12 |
| 2016/0343467 A1* | 11/2016 | Wen | C23C 16/06 |
| 2016/0366724 A1* | 12/2016 | Kessler | G01N 25/72 |
| 2017/0057618 A1* | 3/2017 | Khozikov | B64C 7/02 |
| 2017/0081033 A1* | 3/2017 | Steinwandel | H05B 3/145 |
| 2017/0361935 A1* | 12/2017 | Hull | B64D 15/12 |
| 2018/0213606 A1* | 7/2018 | Hu | H05B 3/20 |
| 2018/0346133 A1* | 12/2018 | Paulson | B64D 15/12 |

* cited by examiner

CARBON NANOTUBE ANTI-ICING AND DE-ICING MEANS FOR AIRCRAFT

CROSS-REFERENCE TO RELATED APPLICATIONS

This application claims priority to U.S. Provisional Application No. 62/452,927 filed on Jan. 31, 2017. The content of the above application is incorporated by reference in its entirety.

FIELD OF THE DISCLOSURE

This disclosure relates generally to the field of ice prevention on surfaces by means of anti-icing and/or de-icing. More specifically, this disclosure relates to a system and method for anti-icing and/or de-icing of aircraft.

BACKGROUND

Icing on surfaces can cause serious problems. On airplanes it can increase drag and weight while decreasing lift and thrust. In the worst situations, it can cause planes to crash. No less problematic, plane takeoffs for passenger planes and other types of planes are frequently delayed from taking off while the planes are de-iced. Plane delays cost the US economy 32.9 billion dollars a year. The plane can also stall at a lower angle of attack and a higher air speed. From 2006 to 2010, it has been reported that at least 228 airplane accidents took place that were related to issues related to icing of airplane surfaces.

Icing on other surfaces such as on pipelines causes other multiple problems. Pipes can crack as they experience temperature changes due to freeze/thaw cycles. The decrease in internal pipe temperature caused by icing can also cause a decrease in flow rate within the pipe, as well as cause the pipe to crack if the internal substance expands due to the decrease in temperature.

For airplanes in flight, several methods exist to remove or prevent ice formation. Conventional techniques for removing ice formation involves using air from the airplane engine, whereby the airplane engine air can be bled into ducting along wings and other areas with the hot air increasing the temperature of the iced area. Ice can be removed also by inflatable physical boots that knock frozen ice off wings. Other conventional techniques include anti-ice chemicals that can be slowly released onto the wing in a weeping wing system. Finally, electrical energy can be used to directly heat up wings or other areas to prevent or remove ice.

Recently, various new chemical composites including some that use carbon nanotubes, have been suggested to improve on ice prevention or removal. The use of these chemical composites remove the need for complicated inflatable boot systems, remove the need to continually release chemicals as in weeping systems, and allow more ice to be removed with less power usage than pure electrical energy systems.

U.S. Pat. No. 8,752,279 describes using a thermally conductive film containing hexagonal boron nitride that can be heated with an electrical heater. U.S. Pat. No. 8,931,740 describes a method of using carbon nanotubes with two different conductivities underneath wings one that provides a heating conductor and one that provides a heating element. U.S Patent Application No. 2012/0082806 describes the use of carbon nanotubes as a coating that allows electricity to be used to heat an entirety of a surface. The coating is sprayed on the surface to be coated. Various other patents disclose the use of carbon nanotubes in laminated resistive heaters.

Each of these approaches suffer from various problems. Hexagonal boron nitride disclosed in the '279 patent is a complicated chemical formation that requires the use of heavy metals which have been known to have negative environmental effects. The '740 patent discloses an overly difficult process which requires the use of complicated nanotube formations with different electrical conductivities. U.S Patent Application No. 2012/0082806 discloses spraying a de-icing coating on the surface, but the type of coating disclosed is likely to decrease the aerodynamics of the plane and thus increase fuel usage.

Thus, there is a need for a system and method for anti-icing and de-icing that overcomes these and the many other shortcomings of conventionally available techniques.

SUMMARY

In one aspect, a system for anti-icing and de-icing an aircraft is presented herein according to one or more embodiments. In one, non-limiting embodiment, the system may include an electrically conductive coating. The system may further include an electrical circuit that includes one or more electrical leads, whereby the one or more electrical leads includes either electrical wires or metal strips. Further, the system, according to one or more embodiments, may further include a control unit, whereby the control unit has a negative end and a positive end. In one or more embodiments, the negative end is connected to a first end of the electrical circuit, and the positive end is connected to a second end of the electrical circuit. In another embodiment, the system may include a plurality of temperature sensors connected to the control unit, as well as a plurality of ice detector sensors connected to the plurality of temperature sensors and the control unit.

In another aspect, a method or process for anti-icing and de-icing an aircraft is presented herein according to one or more embodiments. In non-limiting embodiments, this process may include removing existing leading edge ducting, removing any existing piccolo tubing, removing attaching hardware attached to the leading edge ducting and to the piccolo tubing, replacing removed existing leading edge ducting with new leading edge skins, spraying or applying electrically conductive coating comprising polyurethane and carbon nanotubes underneath the skin of the leading edge. The process may further include attaching electrical circuits that include either electrical wiring or metal strips to the new leading edge skins, attaching a control unit to the electrical circuits and within an interstitial space of an aircraft's wing, attaching a plurality of temperature sensors and a plurality of ice formation detectors to the control unit; and spraying the interstitial space with an electrically conductive coating that may include a mixture of a silicon resin and carbon nanotubes or may alternatively include a mixture of graphene and polyurethane, graphene and a silicon resin, or carbon nanotubes and polyurethane.

In some embodiments, the preceding and following embodiments and descriptions are for illustrative purposes only and are not intended to limit the scope of this disclosure. Other aspects and advantages of this disclosure will become apparent from the following detailed description.

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DEFINITIONS

Figure 1:
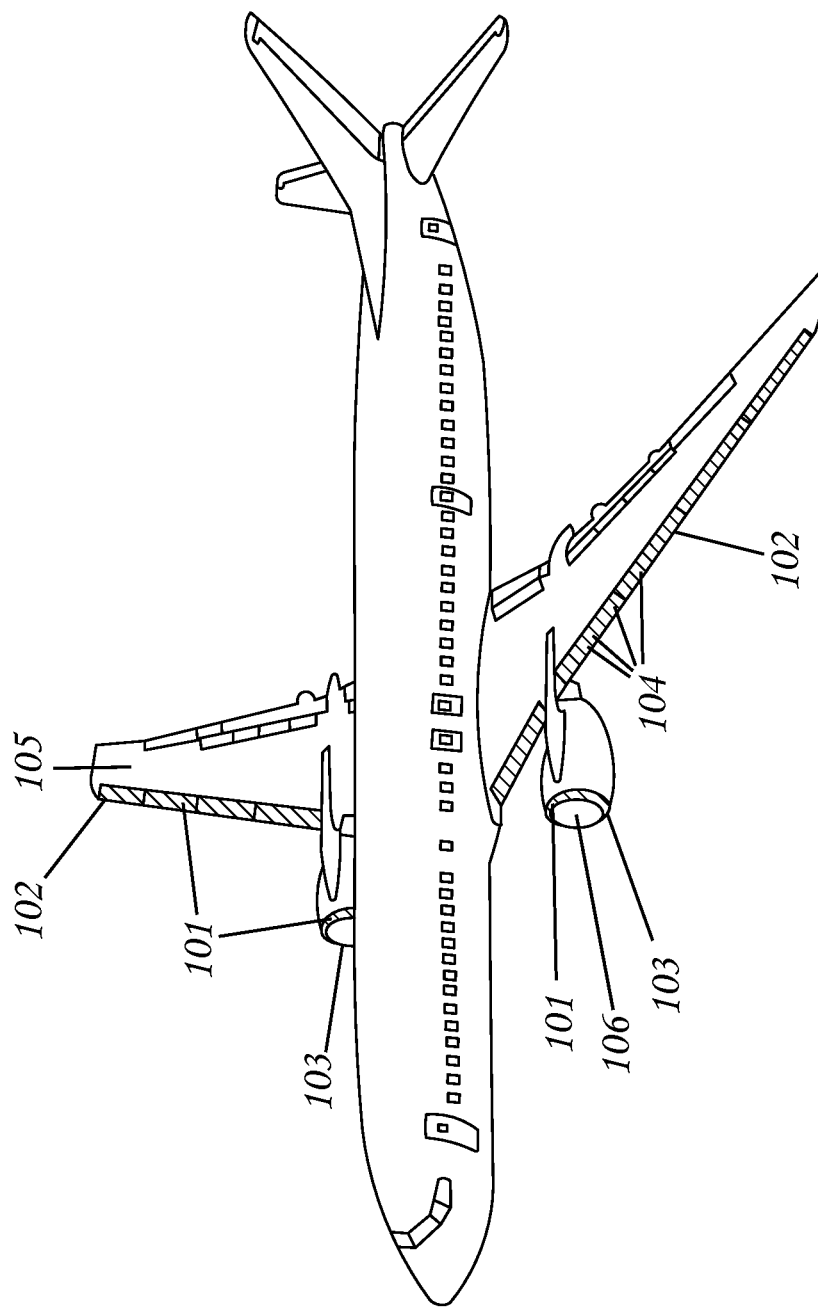
FIG. 1 shows a plane body with exemplary components for a system and method for anti-icing or de-icing an aircraft according to embodiments of the present disclosure.

As used in the present disclosure, the following terms are to be attributed the meanings assigned in this section and listed below:

"Anti-icing" may refer to the act of preventing ice from forming on a surface of an aircraft.

"De-icing" may refer to the act of melting any ice that has formed on a surface of an aircraft.

"Bulkhead" (forward) refers to an upright wall or partition within an engine inlet.

"Carbon nanotubes" refer to tube-shaped material made of carbon and having a diameter measured on the nanometer scale.

"Engine inlet" refers to the duct on an aircraft's engine that may provide for smooth intake of airflow into the engine.

"Leading edge" refers to the front part of an airplane wing which first contacts the air.

"Nacelle" refers to the streamlined outer housing of an engine.

"Parallel circuit" refers to a closed circuit with multiple current paths that run parallel to one another.

"Simple circuit" refers to a basic or straight circuit path that allows for a linear electrical current path.

"Spar" (front) refers to the load bearing internal structural members comprising the frame of the wing of an aircraft.

DETAILED DESCRIPTION

In the Summary above, this Detailed Description, the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

Embodiments in the present description are generally directed to a system and method for anti-icing and de-icing aircraft (whereby aircraft may also be referred to herein as airplanes). The one or more embodiments may be used for any type of aircraft known in the art or yet to be developed. This includes new and old (modern and traditional) aircraft.

One or more non-limiting embodiments for a system and method for anti-icing or de-icing an aircraft may include the presence of (1) one or more electrical leads which may be placed in a suitable arrangement on engine inlets and wings, (2) electricity that runs through the electrical leads that heat up (3) a conductive coating, which subsequently heats up the engine inlets and wings, (4) control panels located within the aircraft and specific locations to control the entire heating system, (5) various temperature sensors to monitor different temperatures of an aircraft as well as (6) various ice detection sensors to detect the presence of ice. Some or all of these above-identified elements may be used in one or more embodiments, and additional components other than those listed above may also be used in alternative embodiments. Further details are provided below with reference to the Figures.

Turning to FIG. 1, FIG. 1 shows an example of a plane body having elements of a system and method in accordance with one or more embodiments. FIG. 1 shows the electrically conductive coating or film 101. In one or more embodiments, it may be preferable that electrically conductive coating or film 101 made from a mixture of a high temperature resin, such as a silicon resin, mixed with carbon nanotubes, which may be a coating/paint or a film that is plasma sprayed, applied, brushed, or otherwise located using any means known in the art underneath the skin of a leading edge 102 of an aircraft wing 105 or the forward ring 103 of the engine inlet 106. In one or more embodiments, it may be preferable for the electrically conductive coating or film 101 to be located within a range from about 8-15 centimeters of a leading edge 102 of an aircraft wing 105 or the forward ring 103 of the engine inlet 106. Further, it may be desirable that the electrically conductive coating or film 101 be located within a range from about the first 10-12 centimeters of a leading edge 102 of an aircraft wing 105 or the forward ring 103 of the engine inlet 105. Those of ordinary skill in the art will appreciate that other ranges and distances may be used as well.

Metal or other composite surfaces of an aircraft may work with the electrically conductive coating or film 101 in a desirable way to achieve anti-icing or de-icing of the aircraft surfaces. In one or more embodiments, the electrically conductive coating or film 101 may be of a particular brand known by those skilled in the art as NEETcoat™. NEETcoat™ is a heat generating coating that is produced by NanoRidge Materials, Inc. However, those of ordinary skill in the art will appreciate that alternative types of heat generating or electrically conductive coating may be used other than NEETcoat™.

Paint or film exists that mixes a high temperature resin, such as silicon resin, with carbon nanotubes, but the present invention would work with any coating that mixes carbon nanotubes in a manner having suitable proportions of the nanotubes. The electrically conductive coating or film of a high temperature resin and carbon nanotubes, such as electrically conductive coating or film 101, are incorporated into host matrices such as, but not limited to, polymers, plastics, fibers, and ceramics. Once this is done, the host matrices are electrically conductive, as well as capable of spreading and generating heat.

In one or more embodiments, the electrically conductive coating or film 101 may be described as lightweight, durable, resists corrosion, and provides uniform heating across a variety of surfaces and profiles such as the outer and inner curved surfaces of any aircraft airfoils, although those of ordinary skill understand and appreciate that electrically conductive coating or film 101 may have additional attributes and features not mentioned above. Further, electrically conductive coating or film 101 may have only some of the attributes mentioned above, and is not limited to including all these attributes in any way.

It is noted that besides a mixture of a silicon resin and carbon nanotubes, an acceptable coating for electrically conductive coating or film 101 can be made using graphene, which is a 2-dimensional carbon allotrope that may be mixed with polyurethane paint.

FIG. 1 includes a plurality of electrical leads 104. The electrical leads may be individual units or members applied to a surface of the body of the plane (as shown in FIG. 1). In one or more non-limiting embodiments, these electrical leads 104 may be in the form of electrical wires. In an alternative embodiment, the electrical leads 104 shown in FIG. 1 may be in the form of metal strips. In one or more embodiments, the electrical leads 104 may be any length in size, including longer uniform sheets. Thus, either electrical wires or metal strips may be applied on various surfaces of an airplane as shown in FIG. 1 with respect to electrically conductive coating or film 101 (as well as throughout FIGS. 2-6). If electrical wires are utilized for the electrical leads 104, then the electrical wires are preferably made out of carbon nanotubes and can be used anywhere copper wire is currently used. The carbon nanotube wires are a direct replacement for copper wire and is smaller and more flexible making this type of wiring more versatile than traditional metal wires or electrical leads. The carbon nanotube wires also have increased capacity for electrical conductivity as well as higher durability, tensile strength, sustainability, and hardness, despite being lighter.

If metal strips are utilized for electrical leads 104, then the metal strips may be preferably made of copper. Any type of metal known in the art may be suitable. However, it may be desirable that metal strips be made from metal such as, but not limited to, aluminum, stainless steel, or copper. In one embodiment, aluminum strips may be used for metal strips that are to be used on aluminum structures or surfaces (e.g. surfaces of an aircraft). Further, in other embodiments, stainless steel strips may be used for metal strips that are to be used for composite structures. In other embodiments, coated copper strips may be used for metal strips to be used on any structure. Either the carbon nanotube wiring or the metal strips may be used for the electrical leads 104 as described above.

In one or more embodiments, a power supply 702 will provide electricity such as electricity produced by either the aircraft or engine generators. This electricity will flow from the power supply 702 to at least one electrical connector 701 and then to the electrical leads 104 including electrical wires or metal strips. The electrical wires or metal strips may be applied underneath the skin (e.g. aluminum or other composite) of the aircraft wing's leading edge 102 or the aircraft's engine inlet's forward ring 103. The aircraft wing's leading edge 102 and the engine inlet's forward ring 103 are coated as described above and so the electrical leads 104 may be in direct contact with the coating. Applying the electrical leads 104 underneath the skin of the aircraft may beneficially ensure that the electrical leads 104 does not affect the aerodynamic properties of the wing.

Figure 2:
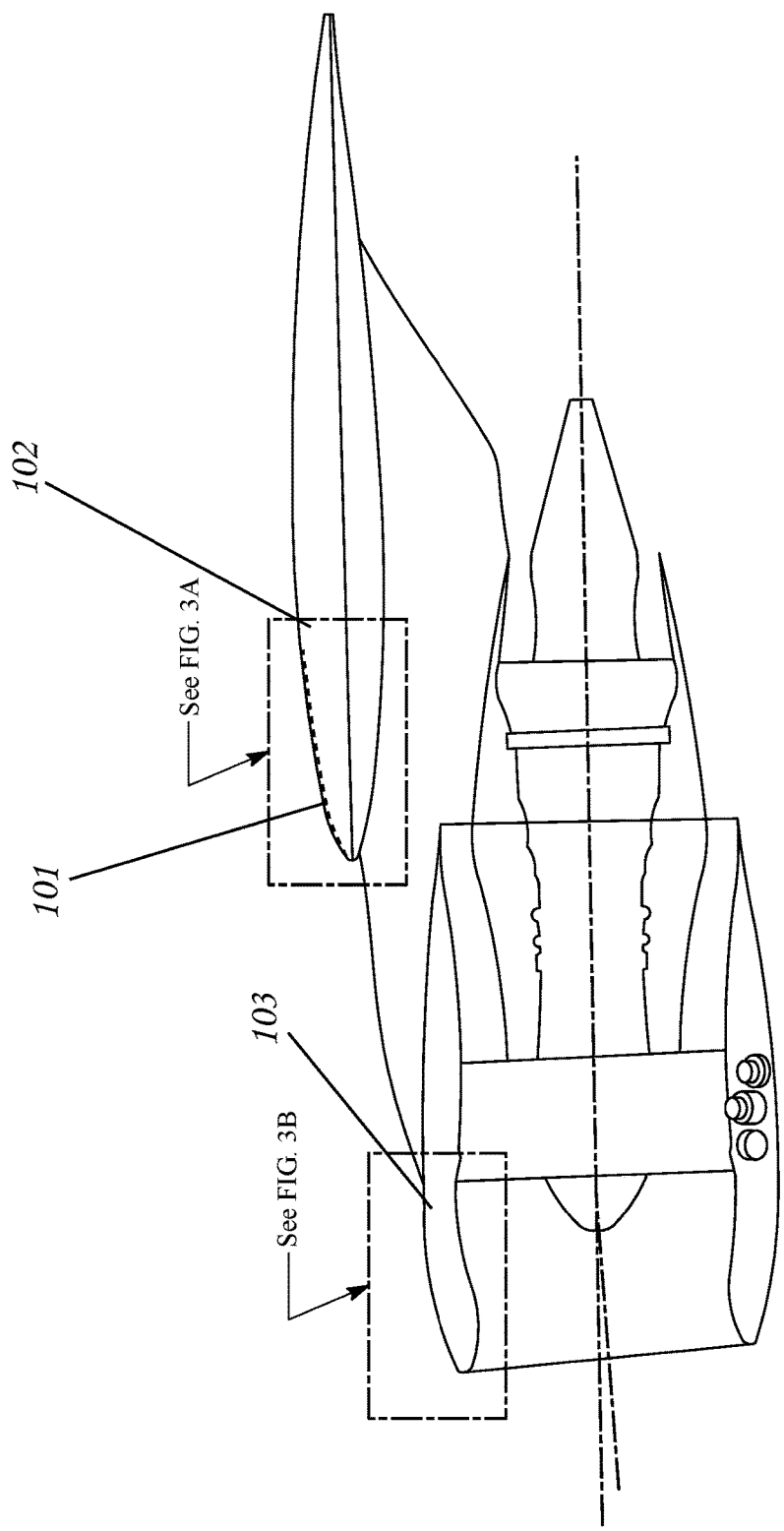
FIG. 2 shows a cross-sectional side view of a leading edge of an airplane wing shown in FIG. 1 and also a cross-sectional side view of an airplane engine inlet shown in FIG. 1 according to embodiments of the present disclosure.

FIG. 2 shows a side view of the aircraft wing's leading edge 102 and a cross sectional view of the engine inlet's forward ring 103. This figure also shows the relative location on which the electrical leads 104 (e.g. either electrical wires or metal strips) and the electrically conductive coating or film 101 may be located.

Figures 3A, 3B:
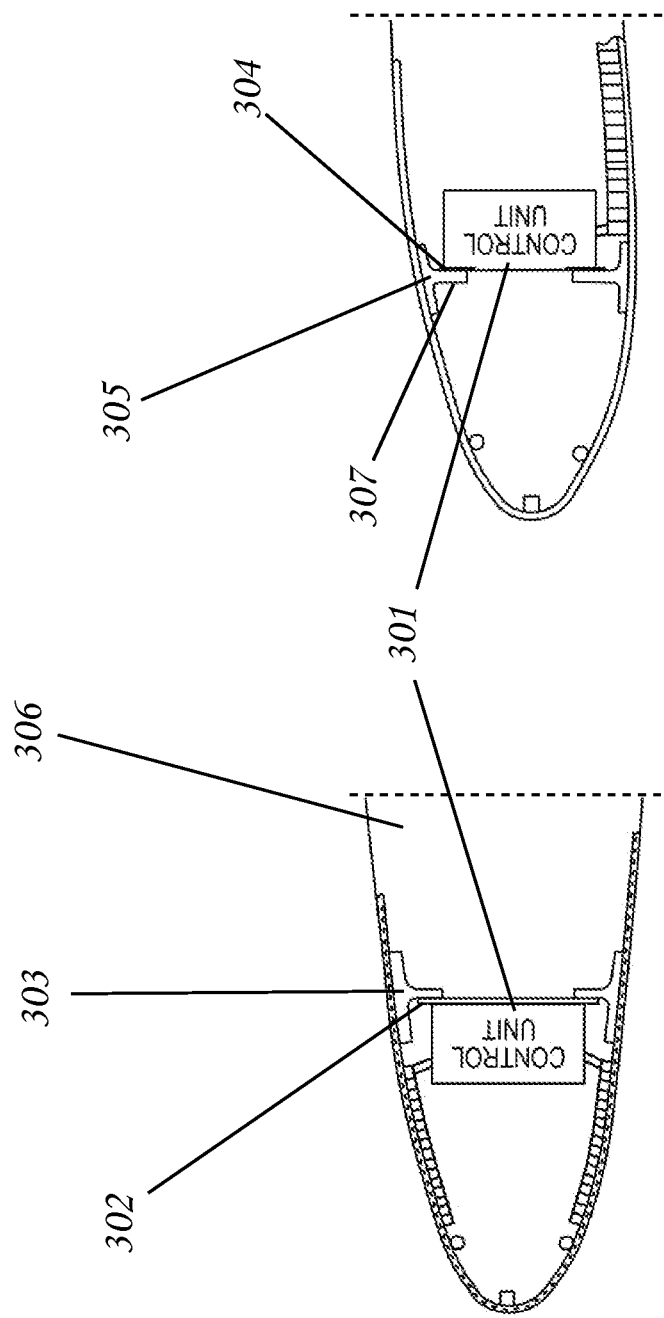
FIG. 3A shows a partial cross-sectional side view of the leading edge of the airplane wing shown in FIG. 2 according to embodiments of the present disclosure.
FIG. 3B shows a partial cross-sectional side view of the airplane engine inlet shown in FIG. 2 according to embodiments of the present disclosure.

FIG. 3A shows a close-up partial cross-sectional side view of the aircraft wing's leading edge 102 forming an interstitial space 306. A control unit 301 is mounted on the forward face 302 of the aircraft wing's front spar 303 inside the wing's interstitial space 306 and connected to the electrical leads 104 (e.g. electrical wires or metal strips). FIG. 3B shows a close-up partial cross-sectional side view of the engine inlet's forward ring 103 with a similar placement of the control unit 301. Rather than the forward face 302 of the aircraft wing's front spar 303, the control unit 301 may preferably be mounted on the aft side 304 of the forward bulkhead 305 of an engine inlet's forward ring 103. This mounting is preferred as this area has the most space, but the control unit 301 can be placed in similar strategic locations such as the forward side 307 of the forward bulkhead 305, or any other alternative location not mentioned above.

Figure 4:
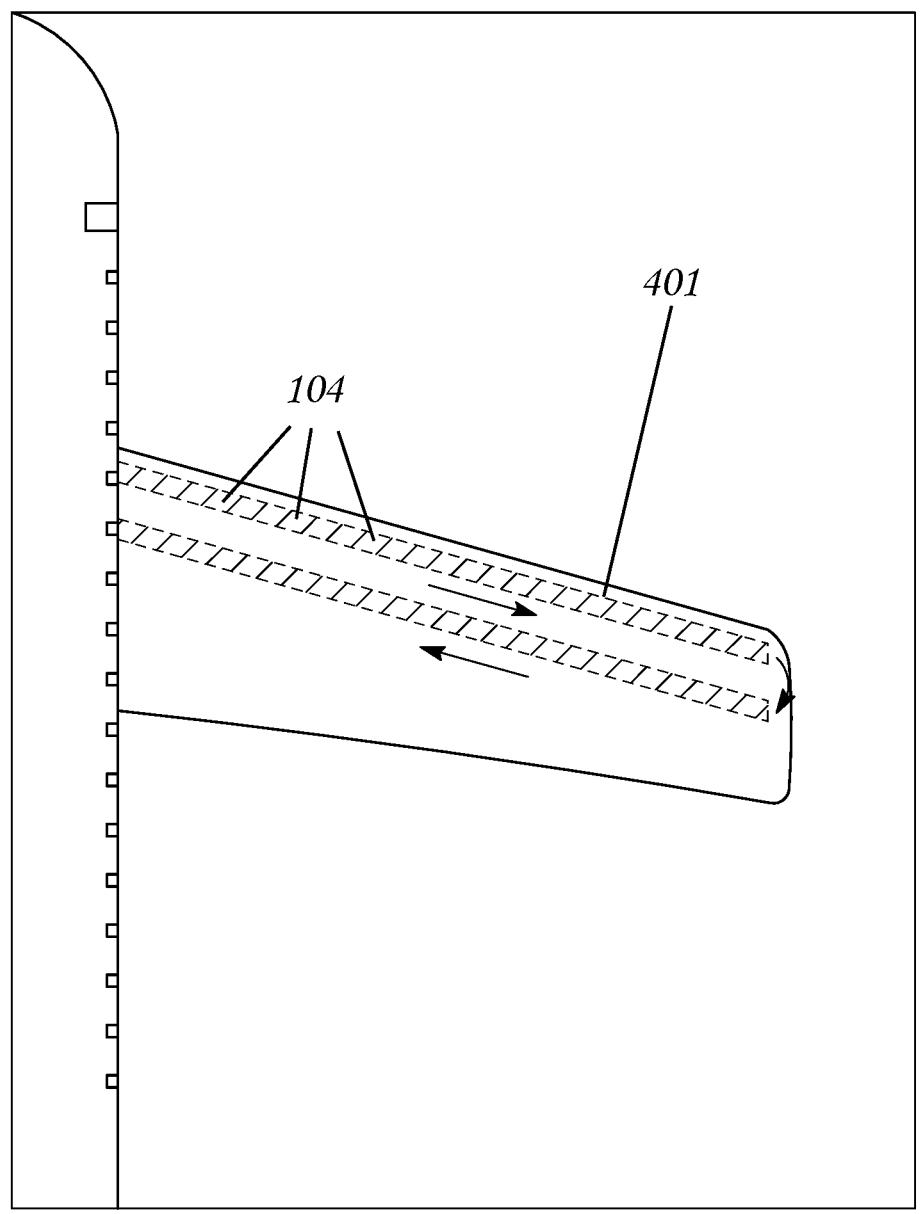
FIG. 4 shows an airplane wing using an exemplary simple circuit according to embodiments of the present disclosure.

FIG. 4 shows one exemplary embodiment with a simple circuit 401 of the electrical leads 104 (e.g. electrical wires or metal strips). One embodiment features the electrical leads 104 placed in two rows of a continuous line of the electrical leads 104 that covers the length of the aircraft wing's leading edge 102.

Figure 5:
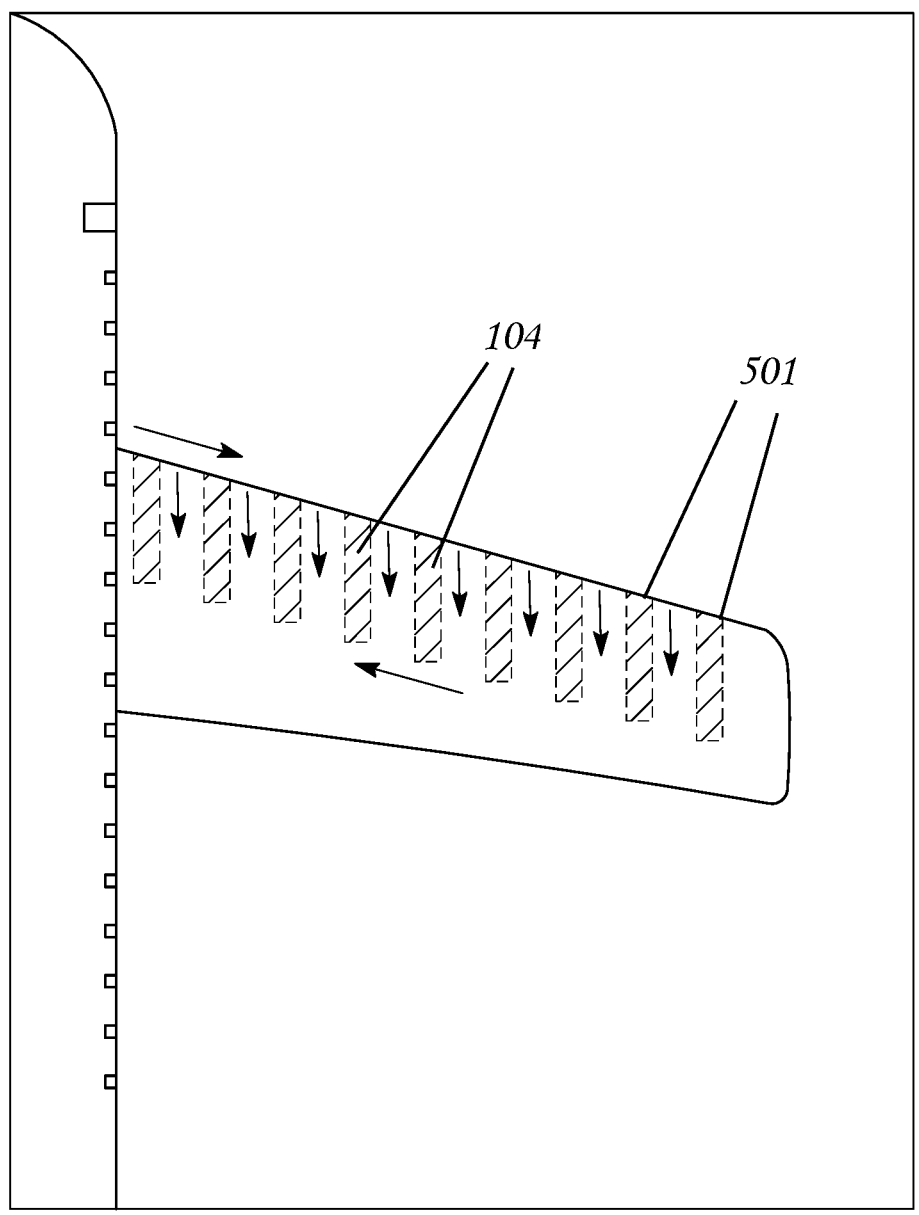
FIG. 5 shows an airplane wing using an exemplary parallel circuit according to embodiments of the present disclosure.

FIG. 5 shows another embodiment with a parallel circuit 501 with shorter instances of the electrical leads 104 (e.g. electrical wires or metal strips) wherein the electrical leads 104 and the shorter instances therein are placed parallel to one another but not necessarily connected to one another. Although either the simple circuit 401 or the parallel circuit 501 are preferred, it is foreseeable that various combinations of circuit layouts may be used to heat various aircraft components. Further, those of ordinary skill in the art will appreciate that alternative lengths and widths of the electrical leads 104 other than that shown in FIGS. 4 and 5 may be used, as well as the distances and pattern of arrangement shown in FIGS. 4 and 5.

Figure 6:
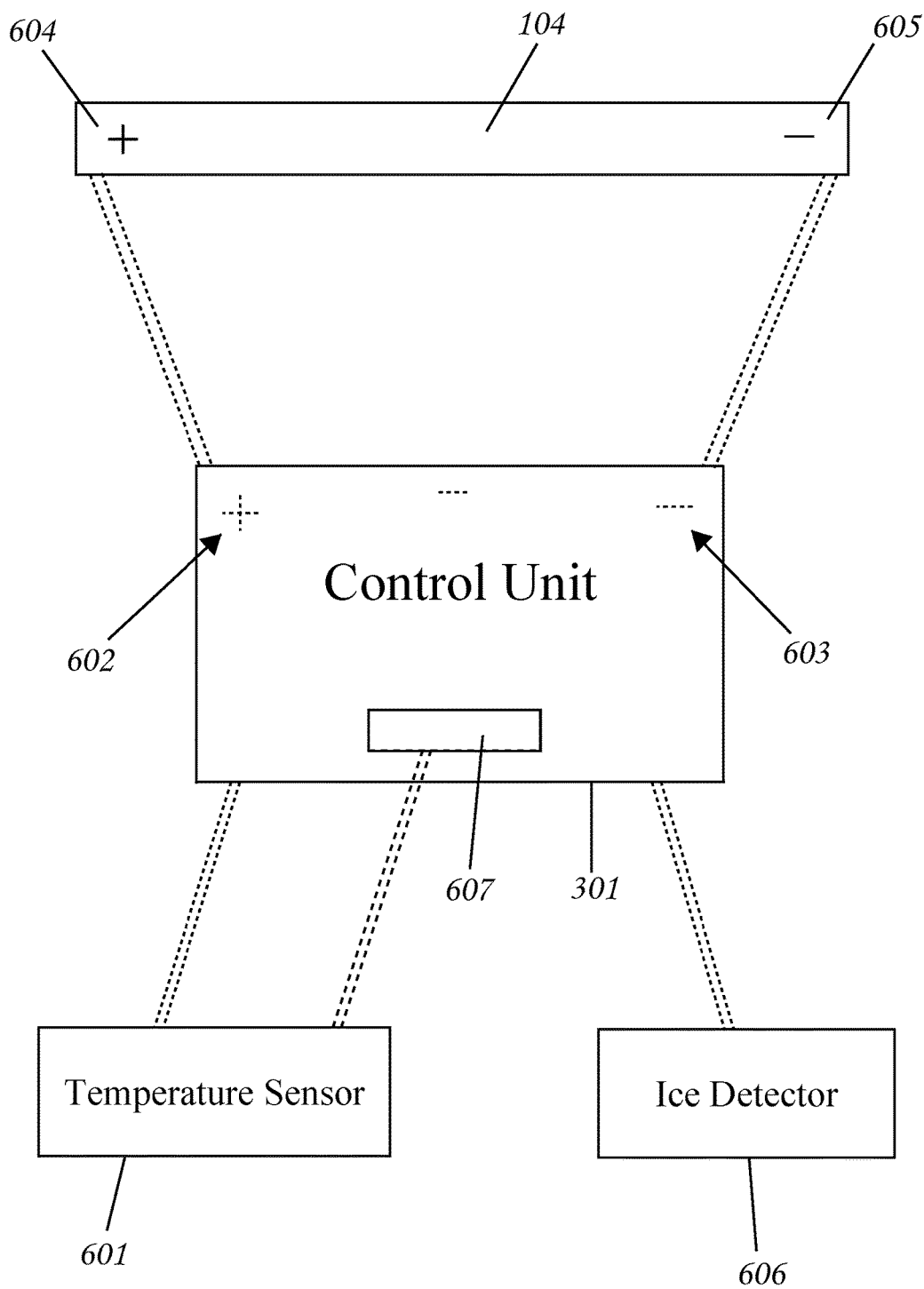
FIG. 6 shows an isometric view of one embodiment of a control unit connected to electrical leads and temperature sensors according to embodiments of the present disclosure.

FIG. 6 shows a block diagram of the control unit 301, electrical leads 104 (e.g. electrical wires or metal strips), temperature sensors 601, and ice detector sensors 606. Any type of temperature sensors and ice detector sensors known in the art may be used. As shown in FIG. 6, in one embodiment, the positive end 602 of the control unit 301 may be attached to a corresponding positive end 604 of the electrical leads 104 while the negative end 603 of the control unit 301 is attached to corresponding negative end 605 of the electrical leads 104 such that a current flows in the same direction through each piece of the electrical lead 104. The uniform current flow will allow for uniform and efficient heating of the wing's leading edge 102 or engine inlet's forward ring 103. This either prevents ice formation or melts ice that has already accumulated.

Temperature sensors 601 (as shown in FIG. 6) may be preferably mounted inside the interstitial space 306 of the wing 105 or engine inlet 106 with the electrically conductive coating or film 101 to monitor the airplane wing's temperature. As noted above, in one embodiment, the electrically conductive coating or film 101 may be a mixture of polyurethane and carbon nanotubes. A useful example of such a suitable electrically conductive coating or film 101 having a mixture of a high temperature resin, such as silicon resin, and carbon nanotubes may be a coating. In alternative embodiments, the electrically conductive coating or film 101 may be a mixture of polyurethane and graphene or polyurethane and carbon nanotubes.

FIG. 6 also includes a set of ice detector sensors 606. "Set" as used herein may refer to "one or more." Ice detector sensors 606 may also be connected to the temperature sensors 601 to detect the formation of ice on a surface of an aircraft. The ice detector sensors 606 can work as a failsafe in case the temperature sensors 601 do not work properly in detecting temperature changes to trigger the electrical current from the control unit. The temperature sensors 601 may be connected to the control unit 301, in one or more embodiments, and work with the ice detector sensors 606 to either prevent ice buildup or melt ice that has already formed.

In one embodiment, a safety switch 607 is installed on board the control unit 301 and connected to temperature sensors 601 to shut off the electricity provided to a particular surface of the airplane having the electrical leads 104 if the temperature on the surface of the airplane rises above a certain temperature. For example purposes only, and without limitation thereto, if the temperature on the surface rises anywhere near or above 250 degrees Fahrenheit. Further, in another exemplary embodiment, if the temperature exceeds 200 degrees Fahrenheit, a red overheat light may be illuminated on an aviator panel that may be located near a pilot of the airplane (for example) or may be visible to other maintenance personnel or other individuals attempting to de-ice or anti-ice a surface of a plane.

This embodiment shown in FIG. 6 also includes electrical leads (e.g. 104), which may be in the form of metal strips that made be made from, but not limited to, aluminum, stainless steel, or copper. These metal strips may be attached to the polyurethane and carbon nanotube coating or film (e.g. 101) such that the electrically conductive coating or film 101 will evenly heat the areas on which it is applied via an electric current that runs through the metal strips. Alternatively, electrical wires made of carbon nanotubes may also be used instead of metal strips for the electrical leads 104 (as shown in FIGS. 1-6). In one or more embodiments, the metal strips (when utilized in a system) may be arranged in a simple circuit for a uniform and evenly distributed electrical current path. Alternatively, the metal strips may be arranged in a parallel circuit or any other circuit that provides an even distribution of electrical current along the leading edge of the aircraft's wing (e.g. 102 as shown in FIG. 1) or the forward ring of the engine outlet (e.g. 103 as shown in FIG. 1).

This embodiment shown in FIG. 6 also includes a control unit, such as control unit 301. Control unit 301, in one embodiment, may be attached to the front face of a structural spar located within the interstitial space of the leading edge of the aircraft's wing, such as the leading edge 102 of the aircraft's wing. Alternatively, control unit 301 may be attached to the aft side of the forward bulkhead (e.g. forward bulkhead 305) located within the interstitial space (e.g. interstitial space 306) of the forward ring of the engine inlet (e.g. forward ring 103). Temperature sensors 601 and ice detection sensors 606 may be used to signal the control unit to start sending an electric current to the metal strips (or electrical wires if used instead) upon a specified temperature and the detection of ice formation. The pieces of metal strips or electrical wires (e.g. electrical leads 104 shown in FIGS. 1-5) may then simultaneously heat up the electrically conductive coating or film 101, which in turn melts any ice that has formed (e.g. de-icing) or prevents ice from forming in the first place (e.g. anti-icing).

The distance between the electrical leads 104 in either the simple circuit 401 as shown in FIG. 4 or parallel circuit 501 as shown in FIG. 5 may be a function of the area to be covered, how fast the area is to be heated, and the intensity of the voltage from the power source. Silicon resin and carbon nanotube electrically conductive coatings, such as electrically conductive coating or film 101, or similar coatings including NEETcoat™, may be applied underneath the aluminum or composite skin of the airplane in direct contact with the electrical leads 104. This application of the electrically conductive coating or film 101 may beneficially eliminate or at least substantially reduce the chance of disrupting the aerodynamic properties of the aircraft's wings 105 or engine inlets 106.

In one or more embodiments, heating of both the wing 105 and the engine inlet 106 of an airplane may be controlled automatically based on the detected temperatures and/or may be manually controlled (e.g. using a control unit from the cockpit). In one or more embodiments, the safety switch 607 may also be manually controlled (e.g. using a control unit from a cockpit) to shut off the electricity.

Figure 7:
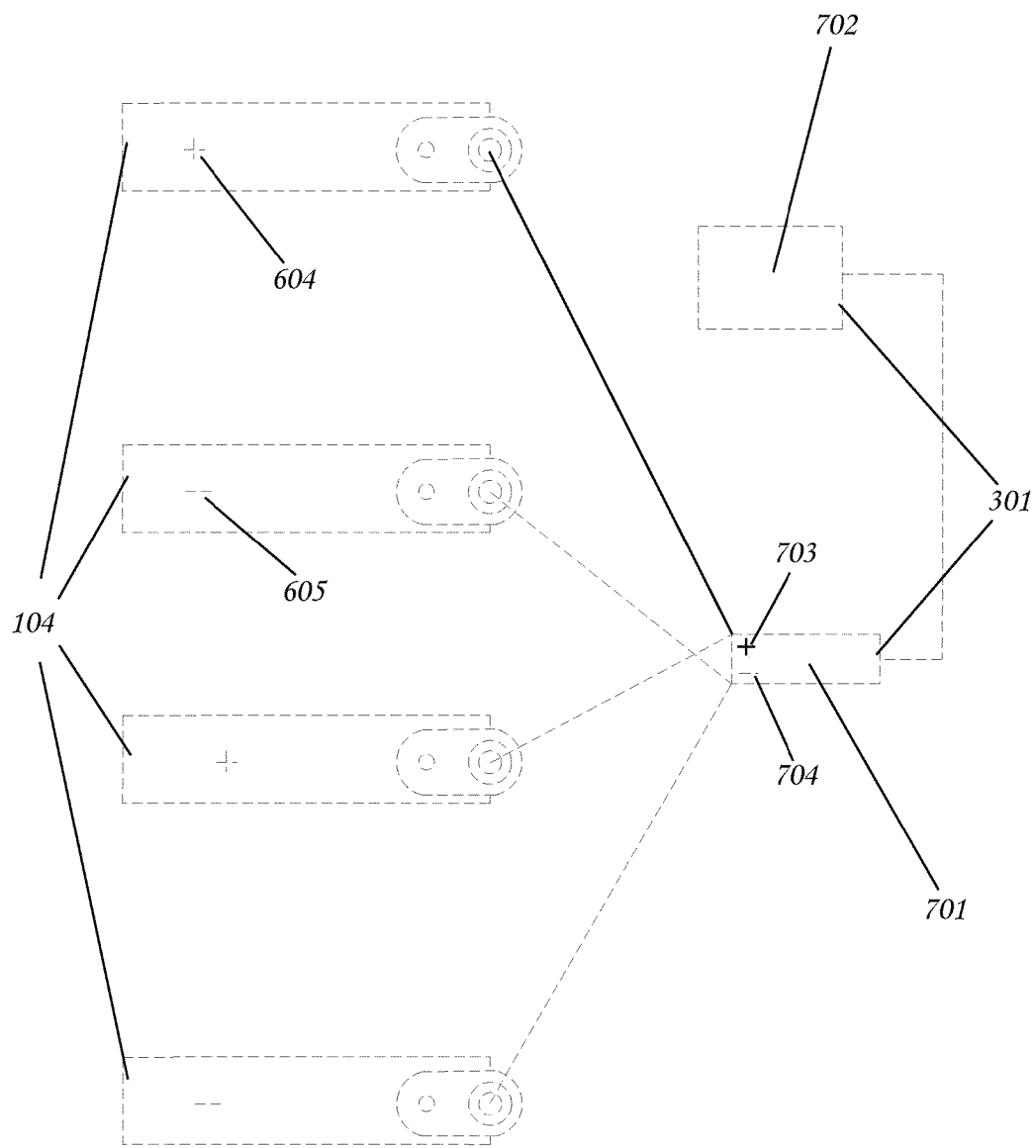
FIG. 7 shows an isometric view of one embodiment of a control unit with a power supply and an electrical connector connected to electrical leads according to embodiments of the present disclosure.

FIG. 7 shows an isometric view of the heating system. In one or more embodiments, the control unit 301 has a power supply 702 and an electrical connector 701 with a positive end 703 and a negative end 704. The power supply provides electrical power to the electrical connector 701 which then sends power to the electrical leads 104. FIG. 7 shows a configuration of electrical leads 104 with corresponding positive 604 and negative 605 ends that pair with the positive end 704 and the negative end 705 of the electrical connector, respectively, 701 of the control unit 301.

Figure 8:
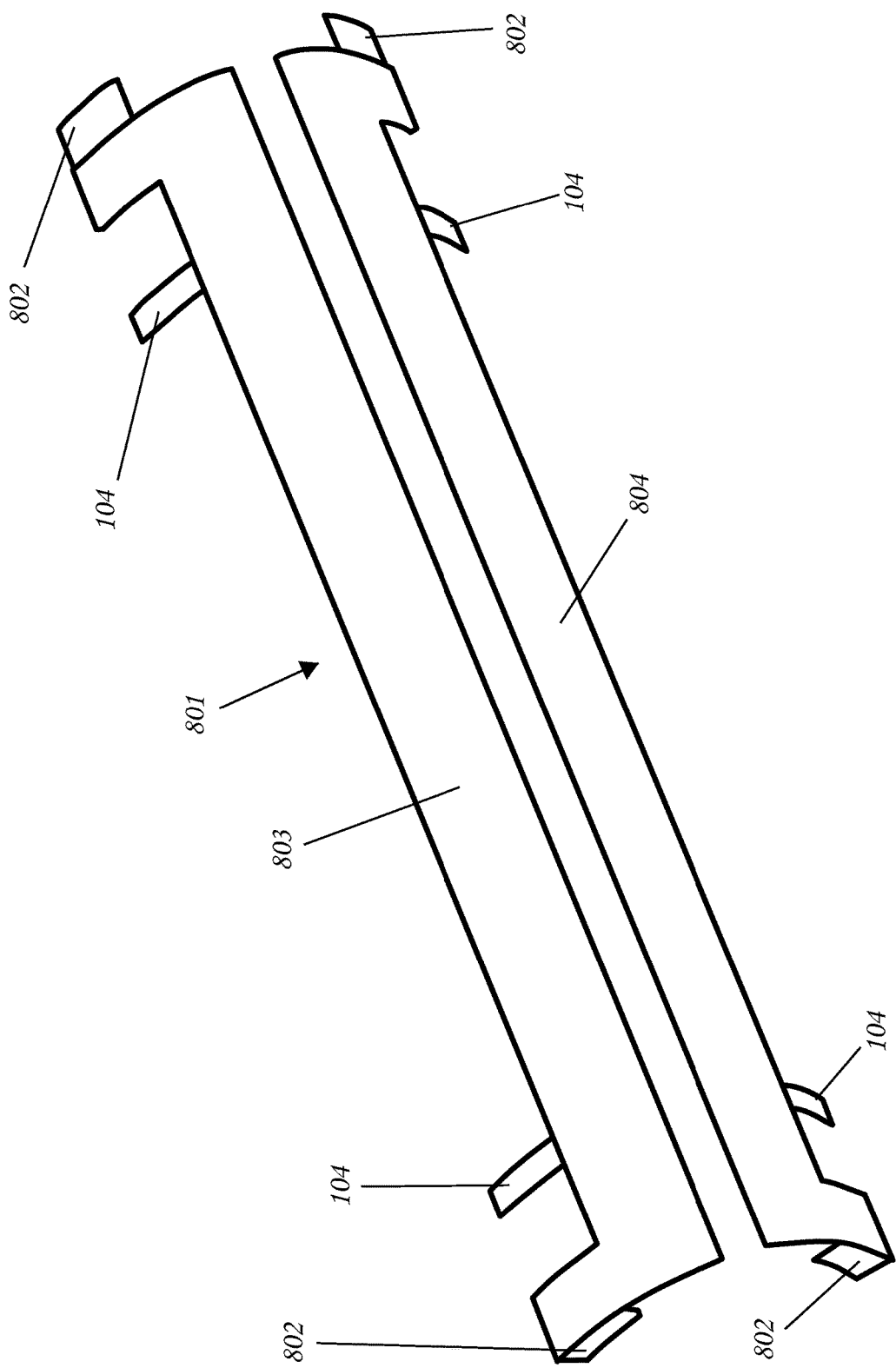
FIG. 8 shows an angular perspective view of the electrical leads and failsafe components housed by a carriage assembly according to embodiments of the present disclosure.

FIG. 8 shows an angular perspective view of the electrical leads 104 held together by a carriage assembly 801 that houses the electrical leads. The carriage assembly 801 has an upper 803 and lower 804 carriage. In one or more embodiments, the upper 803 and lower 804 carriages are made of metal and bonded to the inner skin of the leading edge 102 of the aircraft's wing 105 within the interstitial space 306 of the wing 105. Further, the carriage assembly is coated with the electrically conductive coating or film 101 and heated by the electrical leads 104 as shown. Additionally, the carriage assembly 801 also have outer failsafe rib brackets 802 that add further support for the bonded upper 803 and lower 804 carriages. In other embodiments, the failsafe rib brackets 802 may also be bonded to electrical leads 104 connected to temperature reader failsafe components 607 (shown in FIG. 6) to prevent the overheating of the aircraft wings 105.

Figure 9:
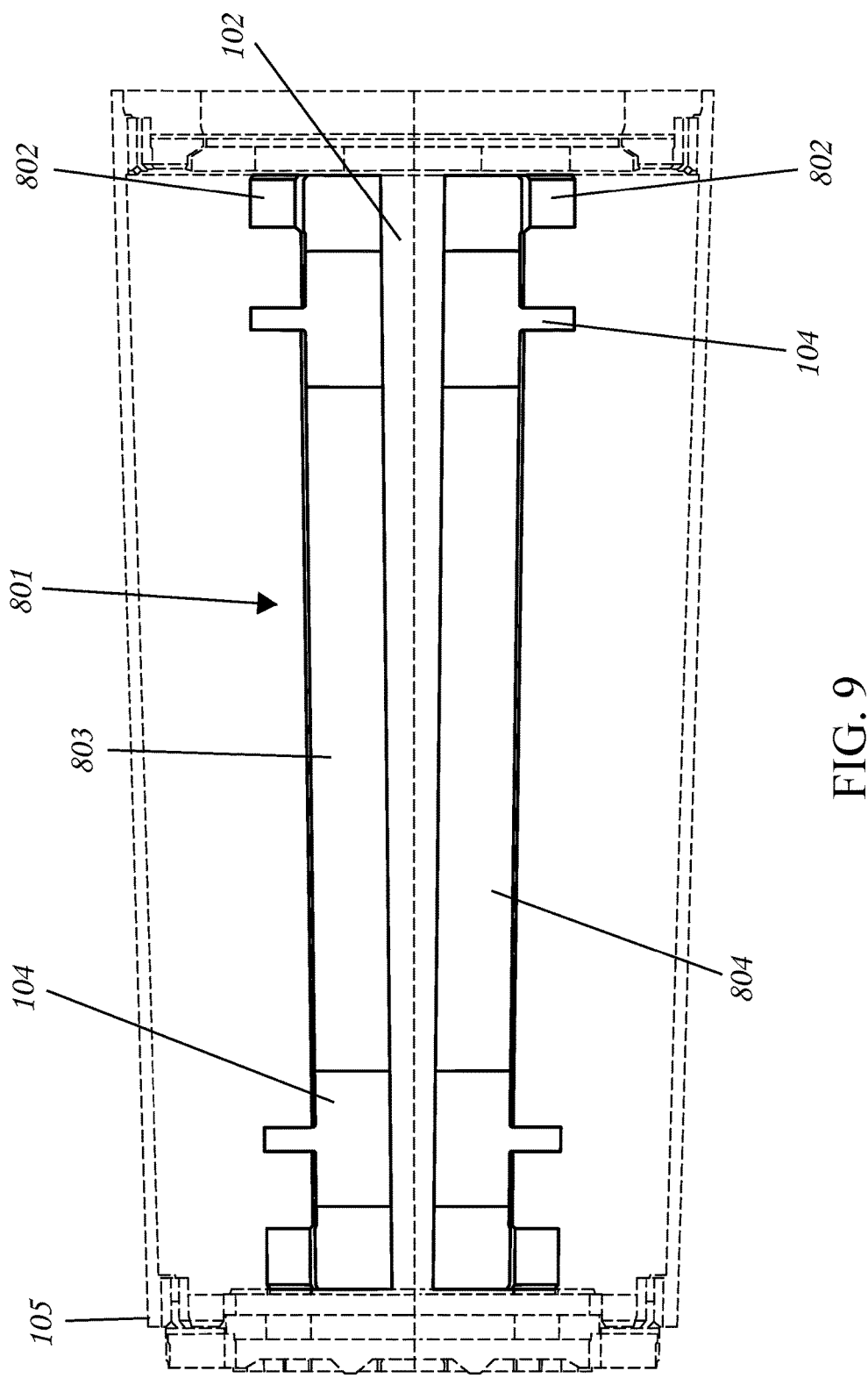
FIG. 9 shows a rear view of the carriage assembly of FIG. 8 attached a portion of the leading edge of an aircraft's wing according to embodiments of the present disclosure.

FIG. 9 shows a rear view of one or more embodiments featuring a configuration of the carriage assembly of FIG. 8 bonded to the inner skin of the leading edge 102 of the wing 105. The wing 105 itself is separable into two halves and in one or more embodiments, the carriage assembly is split into the upper 803 and lower 804 carriages and bonded accordingly to the upper and lower halves of the skin of an aircraft's wing's leading edge 102. This further ensures an evenly distributed heating once the electrical leads 104 are powered by a power supply 702 and the system is turned on.

Figure 10:
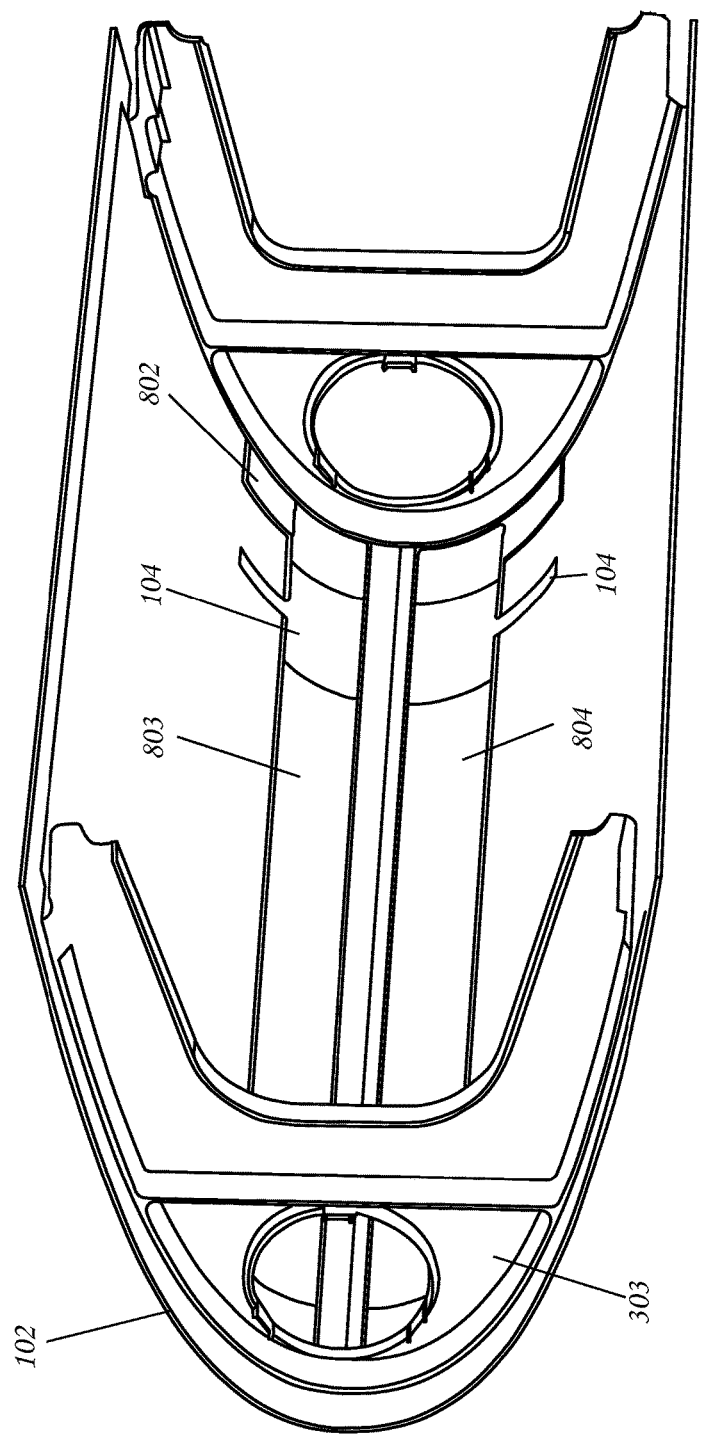
FIG. 10 shows a rear angular perspective view of the inside of a leading edge of an aircraft wing with the carriage assembly of FIG. 8 attached according to embodiments of the present disclosure.

FIG. 10 shows an angular perspective of one embodiment featuring a configuration similar to the configuration shown in FIG. 9 with a carriage assembly of FIG. 8 bonded to the leading edge 102 of the wing. The failsafe rib brackets 802 of the carriage assemblies 803 and 804 in this embodiment are bonded to the front spar 306 of the leading edge 102 of the wing 105. The failsafe rib brackets 802 add stability and help the bonding to stay rigid in some embodiments.

Figure 11:
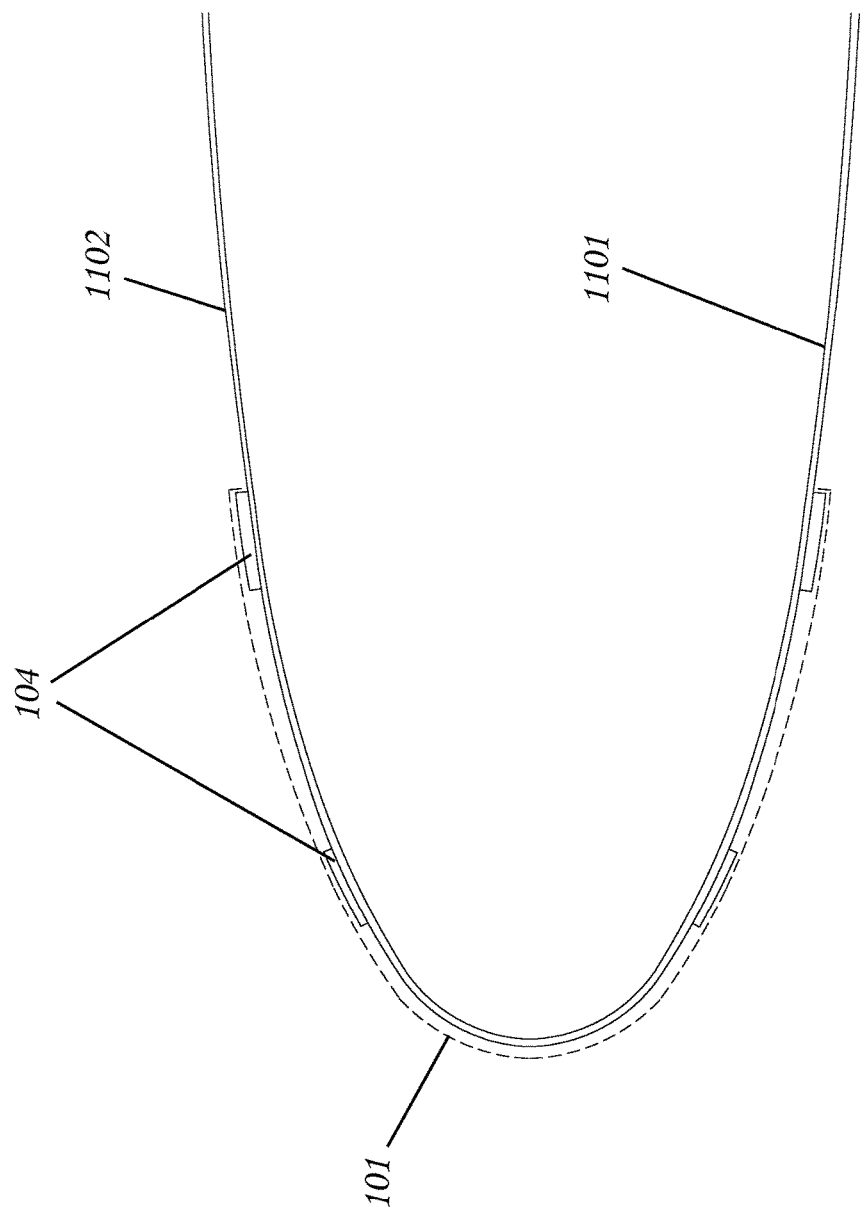
FIG. 11 shows a cross-sectional side view of electrical leads bonded to the inner skin of an aircraft wing according to embodiments of the present disclosure.

FIG. 11 shows a cross-sectional side view of one or more embodiments with bonding layers associated with a procedure for configuring the electrical leads 104 with the electrically conductive coating or film 101. In one or more embodiments, a dielectric coating 1102 is applied to the outer surface of the inner skin 1101 of the leading edge 102 of an aircraft wing 105 or the forward ring 103 of an engine inlet 106. The electrical leads 104 are bonded directly onto the dielectric coating 1102. Finally, a layer of electrically conductive coating or film 101 such as a silicon resin and carbon nanotube coating is applied on top of both the electrical leads 104 and the dielectric coating 1102 to finalize the bonding. This configuration, according to one or more embodiments, allows for an even and efficient distribution of heat. Additionally, this configuration, according to one or more embodiments, is applied in between the inner layer 1101 and outer skin of an aircraft wing's leading edge 102 or an engine inlet's forward ring 103, which ensures that the aerodynamics of the aircraft are unaffected while adding heating/de-icing properties.

Figure 12:
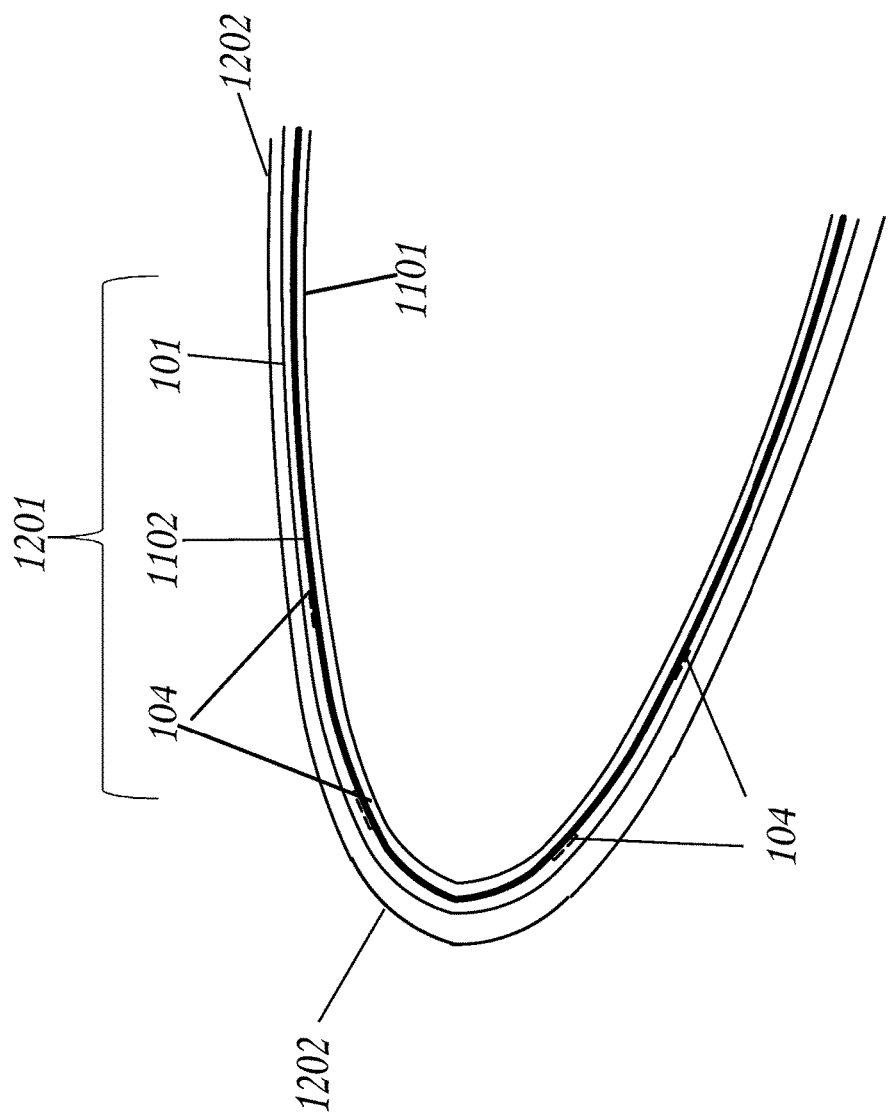
FIG. 12 shows a cross-sectional side view of bonding layers between the outer and inner skin of an aircraft wing according to embodiments of the present disclosure.

FIG. 12 shows a cross-sectional side view of bonding layers according to one or more embodiments. In one or more embodiments, the resin layer 1201 contains an electrically conductive coating or film 101, such as a silicon resin and carbon nanotube coating, electrical leads 104, and a dielectric coating 1102 to finalize the bonding. The resin layer is bonded between the outer skin 1202 and the inner skin 1101 of the aircraft wing's leading edge 102 or the engine inlet's forward ring 103. The resin layer 1201 does not affect aerodynamics but still effectively de-ices a plane with this configuration according to one or more embodiments.

Another embodiment features a method for modifying modern aircraft de-icing systems which use hot engine bleed air that is blown through piccolo tubes to the inside surfaces of the leading edge of an aircraft's wing. Since most modern aircraft have articulating and sometimes translating leading edges with anti-ice ducts attached via linkages, brackets, clips, and other fastener hardware, the leading edges will have to be completely removed. This embodiment, therefore, may include the steps of applying an electrically conductive coating or film 101 such as a silicon resin and carbon nanotube coating underneath the skin of the new leading edge, installing the new leading edge skin to the aircraft, and replacing any removed leading edge ducting, Piccolo tubing, and attaching hardware with proper electrical and sensor attachments, including electrical circuits with electrical leads 104 (e.g. electrical wiring or metal strips), control units 301 (as shown in FIGS. 3A, 3B, and 6) temperature sensors 601, and ice formation detectors 606. The interstitial space of fixed leading edges may simply be sprayed with an electrically conductive coating or film 101 (e.g. silicon resin and carbon nanotube coating) and fitted with electrical leads. Alternatively, vertical and horizontal stabilizers may also be retrofitted with the disclosed anti-icing and de-icing system.

Another embodiment features a method for retrofitting older airplanes with the new system which includes removing all existing anti-icing or deicing system components from the existing aircraft. Since thermal anti-ice components transfer hot engine bleed air from the engine compressor to airplane components prone to icing, retrofitting existing systems involves removing ducting, valves, thermal expansion bellows, heat insulating shrouds, attaching flanges, band clamps, linkages, and attaching fasteners as well as any flexible pneumatic rubber boot de-icing systems that are present as part of de-icing systems. Existing ice detecting sensors/probes, control systems and computers including the cockpit anti-ice panel will then be modified to work with the new silicon resin and carbon nanotube coating (e.g. electrically conductive coating or film 101) anti-ice system.

To retrofit nacelle inlet anti-ice systems the inlet leading edge attached to the inlet forward bulkhead is removed so that the annular perforated piccolo tube and the engine bleed duct can be removed. Once this is completed, the inlet leading edge is treated with a silicon resin and carbon nanotube coating and fitted with electrical leads connected to an electrical power source and to the pilot anti-ice temperature panel.

The embodiments provided herein for a system and method for de-icing and anti-icing aircraft provide a number of advantages over the prior art. For example, the exemplary, non-limiting embodiments provided in the present disclosure may provide for a system for wing and nacelle (e.g. the outer casing of an aircraft engine) heating method that efficiently uses energy resources without compromising the aerodynamics of the aircraft. It is noted, that based on a number of experimental uses, the system and method according to embodiments in the present disclosure is less cumbersome and less difficult to implement than conventional heating methods used to de-ice or anti-ice aircraft.

Of further benefit, it should be noted that the system for de-icing or anti-icing an aircraft, according to one or more embodiments in the present disclosure, can be installed on a new aircraft or an older aircraft. Further, with respect to the associated method, according to one or more embodiments, the method can be applied to modern and older aircrafts with existing anti-icing/de-icing systems without compromising aerodynamics and potentially increasing the efficiency of these aircrafts' engines. Ultimately, one of the many benefits of the system and method according to embodiments of the present description includes efficient and effective anti-icing or de-icing of an aircraft without compromising an aircraft's overall aerodynamics.

While preferred and alternate embodiments have been illustrated and described, as noted above, many changes can be made without departing from the spirit and scope of the embodiments provided in the present disclosure. Accordingly, the scope of the embodiments provided in the present disclosure, is not limited by the disclosure of these preferred and alternate embodiments. Instead, the scope of the invention title be determined entirely by reference to the claims. Insofar as the description above and the accompanying drawings (if any) disclose any additional subject matter that is not within the scope of the claims below, the inventions are not dedicated to the public and Applicant hereby reserves the right to file one or more applications to claim such additional inventions.

All the features disclosed in this specification (including any accompanying claims, abstract, and drawings) may be replaced by alternative features serving the same, equivalent, or similar purpose, unless expressly stated otherwise. Thus, unless expressly stated otherwise, each feature disclosed is one example of a generic series of equivalent or similar features.

Any element in a claim that does not explicitly state "means for" performing a specified function, or "step for" performing a specific function is not to be interpreted as a "means" or "step" clause as specified in 35. U.S.C. § 112 ¶6. In particular, the use of "step of" in the claims herein is not intended to invoke the provisions of U.S.C. § 112 ¶6.

What is claimed is:

1. A system for anti-icing and de-icing an aircraft, the system comprising:
    an electrically conductive coating or film;
    an electrical circuit comprising one or more electrical leads, wherein the one or more electrical leads comprises either electrical wires or metal strips;
    a carriage assembly having an upper carriage and a lower carriage, wherein the carriage assembly houses the one or more electrical leads, wherein the carriage assembly is bonded to a wing of the aircraft, wherein the one or more electrical leads is configured to be heated;
    a control unit comprising a power supply and an electrical connector, wherein the electrical connector comprises a negative end and a positive end, wherein the negative end is connected to a corresponding negative end of an electrical lead of the one or more electrical leads, and wherein the positive end is connected to a corresponding positive end of said electrical lead;
    a plurality of temperature sensors connected to the control unit; and
    a plurality of ice detector sensors connected to said plurality of temperature sensors and said electrical connector.

2. The system of claim 1, wherein the electrically conductive coating or film further comprise carbon nanotubes.

3. The system of claim 1, further comprising a plurality of failsafe rib brackets, wherein the plurality of failsafe rib brackets add support to the upper carriage and the lower carriage of the carriage assembly.

4. The system of claim 1, wherein the metal strips further comprise metal selected from any one of aluminum, copper, or stainless steel.

5. The system of claim 1, wherein said electrically conductive coating or film is applied underneath a skin of a leading edge of an aircraft wing.

6. The system of claim 1, wherein said electrically conductive coating or film is bonded underneath an outer skin of an aircraft wing, and further wherein the electrically conductive coating or film is bonded between the outer skin and an inner skin of a leading edge of the aircraft wing.

7. The system of claim 1, wherein the control unit is affixed to a forward face of an aircraft wing's front spar.

8. The system of claim 1, wherein the control unit is affixed to an aft face of a forward bulkhead of a forward ring of an engine inlet.

9. The system of claim 1, wherein the electrically conductive coating or film comprises a mixture of silicon resin and carbon nanotubes.

10. The system of claim 1 wherein the electrically conductive coating or film comprises a mixture of graphene and polyurethane or carbon nanotubes and polyurethane.

11. The system of claim 1, wherein said electrical circuit comprises a parallel circuit layout.

12. The system of claim 1, wherein said electrical circuit comprises a simple circuit layout.

* * * * *